United States Patent [19]

Daimon et al.

[11] Patent Number: 5,264,476
[45] Date of Patent: Nov. 23, 1993

[54] OLEFIN RESIN COMPOSITION

[75] Inventors: Akio Daimon; Koichiro Ibuki, both of Ichihara, Japan

[73] Assignee: Sumitomo Chemical Company, Limited, Osaka, Japan

[21] Appl. No.: 991,749

[22] Filed: Dec. 17, 1992

Related U.S. Application Data

[63] Continuation-in-part of Ser. No. 775,028, Oct. 11, 1991, abandoned.

[30] Foreign Application Priority Data

Oct. 18, 1990 [JP] Japan ................................ 2-281276

[51] Int. Cl.⁵ .............................................. C08K 5/01
[52] U.S. Cl. .................................... 524/271; 524/482; 524/483; 524/484; 524/485; 524/504

[58] Field of Search ............... 524/271, 482, 483, 484, 524/485, 504

Primary Examiner—Joseph L. Schofer
Assistant Examiner—R. H. Delmendo
Attorney, Agent, or Firm—Cushman, Darby & Cushman

[57] ABSTRACT

An olefinic resin composition which is moldable to shaped articles coatable with coating compositions without primers is prepared by blending (A) a cross-linked olefinic thermoplastic elastomer obtained from a homo- or co-polymer of alpha-olefin ($C_{2-20}$) and elastomeric copolymer composed of alpha-olefins ($C_{2-20}$), (B) a low-molecular weight modified polypropylene having $\overline{Mn}$ of 2,000–20,000 which is grafted with maleic anhydride and (C) a tackifier.

7 Claims, No Drawings

OLEFIN RESIN COMPOSITION

This is a continuation-in-part application of U.S. Ser. No. 07/775,028 filed Oct. 11, 1991.

The present invention relates to an olefinic resin composition and in particular, to an olefinic resin composition which can be molded to shaped articles such as parts of automobiles which can be coated with coating compositions with sufficient film performance without using primers.

Recently, polypropylene resins or polymer blends of polypropylene resins and olefinic copolymer rubbers have been widely used for parts of automobiles and household appliances. Moreover, crosslinked olefinic thermoplastic elastomers which are different from the mere polymer blends have the advantages of high flow properties and heat distortion resistance in the region of soft flexural modulus and are used in preference to the polymer blend type thermoplastic elastomers.

When the molded articles are used as exterior trim parts, they are often coated, but since components of the articles are nonpolar, the articles have no coatability. Therefore, they are generally coated through the steps of degreasing and etching by vapor or solvent cleaning treatment with Chlorothene (trichloroethylene), illuminating kerosine, alcohols or the like, coating with a primer, coating with a facing material and baking of the coat. However, labor-saving and cost-reduction for the coating step have been demanded and especially from the point of environmental problems, there are strong requests for materials which need no cleaning with Chlorothene vapor or materials which need no primers like generalpurpose engineering plastics.

The present invention relates to a composition which requires no primers, but many proposals and reports have been made for obtaining coatability without primers and some of them have been practically employed. They are classified into the following three methods.

(1) Method of efficiently adding polar groups to the surface of molded articles by surface treatments such as flame treatment, corona discharge treatment, plasma spray coating, and ultraviolet ray irradiation.

(2) Method of introducing polar groups into polymers.
  (i) Blending or alloying of polymers having polar groups such as EVA and polyamides.
  (ii) Blending of polymers modified with unsaturated carboxylic acids or derivatives thereof, for example, maleic anhydride-modified HDPE, EVA and EPR.
  (iii) Method of modification by grafting unsaturated carboxylic acids or derivatives thereof on the whole composition in the presence of peroxides. Examples are maleic anhydride-modified (PP/EPR), maleic anhydride-modified styrene-grafted PP.

(3) Methods which aims at interpolative effect.
  (i) Improvement by etching effect or anchoring effect by adding rubbers or fillers.
  (ii) Diminishment of components which produce W.B.L. (weak boundary layer) and which readily bleed to the surface of molded articles, such as oligomers, additives and oils.

However, the above methods have the following problems.

The method (1) needs additional costs of equipment and operation for improvement from the side of equipment, though the method aims at improvement of productivity and stabilization of quality and is effective and is practically employed.

The method (2)-(i) has the problems that the polar groups are difficult to effeciently appear on the surface, the surface polarity changes due to change of environment of molded articles with elasing of time, and the desired coatability cannot be obtained. The method (2)-(ii) has a limit in the amount of the polar groups introduced, resulting in insufficient coatability and besides, has the problems that monomers containing unaltered polar groups remain in a large amount in the polymer to cause generation of smell and corrosion of mold.

The method (3) solely aims at interpolative effect for obtaining coatability and cannot attain substitution for primers.

The object of the present invention is to provide an olefinic resin composition from which molded articles having no problems of generation of smell and corrosion of mold and having sufficient film performance without using primers can be obtained without using surface treating apparatuses, namely, a composition free from the problems seen in the conventional techniques.

As a result of intensive research, the inventors have found that an olefinic resin composition capable of providing film performance of molded articles without using primers and without damaging the inherent properties of olefinic thermoplastic elastomer can be obtained by blending at a specific ratio a specific olefinic thermoplastic elastomer with a low-molecular weight polypropylene modified with maleic anhydride by adding a specific amount of maleic anhydride thereto, thereby to efficiently introduce a polar group into the elastomer and besides, blending the elastomer with a tackifier for rubber at a specific ratio, thereby to easily swell the elastomer with solvent contained in overcoating compositions.

That is, the present invention relates to an olefinic resin composition which comprises the following components A-C.

(A) 100 parts by weight of a cross-linked olefinic thermoplastic elastomer obtained from a polyolefin resin which is a homopolymer or copolymer of α-olefin having 2-20 carbon atoms and an olefinic copolymer rubber which is an elastomeric copolymer composed of two or more α-olefins having 2-20 carbon atoms, or an elastomeric copolymer composed of two or more α-olefins having 2-20 carbon atoms and non-conjugated dienes, (B) 2-20 parts by weight of a low-molecular weight modified polypropylene having a number average molecular weight of 2,000-20,000 obtained by grafting maleic anhydride on polypropylene, said modified polypropylene having an addition amount of 1-8% by weight of maleic anhydride, and (C) 1-20 parts by weight of a tackifier for rubber.

The olefinic resin composition of the present invention will be specifically explained below.

The component A, cross-linked olefinic thermoplastic elastomer, comprises a polyolefin resin and an olefinic copolymer rubber as essential components. The olefinic copolymer rubber can be present in any cross-linked states such as partially cross-linked and wholly cross-linked states.

The polyolefin resin moiety includes homopolymers or copolymers of α-olefins of 2-20 carbon atoms. Typical examples are the following polyolefin resins. Besides, those which are treated with peroxides are also included.

(1) Ethylene homopolymers including both of low-pressure and high-pressure polyethylenes.

(2) Copolymers of ethylene with 15 mol% or less of other α-olefins or vinyl monomers such as vinyl acetate and ethyl acrylate.

(3) Propylene homopolymers.

(4) Random copolymers of propylene with 10 mol% or less of other α-olefins.

(5) Block copolymer of propylene with 30 mol% or less of other α-olefins.

(6) 1-Butene homopolymers.

(7) Random copolymers of 1-butene with 10 mol% or less of other α-olefins.

(8) 4-Methyl-1-pentene homopolymers.

(9) Random copolymers of 4-methyl-1-pentene with 20 mol% or less of other α-olefins.

Examples of the α-olefins are ethylene, propylene, 1-butene, 4-methyl-1-pentene, 1-hexene and 1-octene.

The olefinic copolymer rubber moiety used in the present invention is amorphous random elastomeric copolymers composed of two or more α-olefins of 2-20 carbon atoms. Alternatively, the copolymer rubber may be elastomeric copolymers composed of two or more α-olefins having 2-20 carbon atoms and non-conjugated dienes. Typical examples of these olefinic copolymer rubbers are the following rubbers.

(1) Ethylene-α-olefin copolymer rubbers [ethylene/α-olefin (molar ratio): about 90/10–about 50/50].

(2) Ethylene-α-olefin-non-conjugated diene copolymer rubbers [ethylene/α-olefin (molar ratio): about 90/10–about 50/50].

(3) Propylene-α-olefin copolymer rubbers (propylene/α-olefin copolymer rubbers [propylene/α-olefin (molar ratio): about 90/10–about 50/50].

(4) Butene-α-olefin copolymer rubbers [butene/α-olefin (molar ratio): about 90/10–about 50/50].

As examples of the α-olefins, mention may be made of the same α-olefins as those exemplified for the polyolefin resins.

As examples of the non-conjugated dienes, mention may be made of dicyclopentadiene, 1,4-hexadiene, cyclooctadiene, methylene norbornene and ethylidene norbornene.

Mooney viscosity ($ML_{1+4}$, 100° C.) of these copolymer rubbers is preferably 10–350, especially preferably 30–300. Iodine value (degree of unsaturation) of the olefinic copolymer rubbers containing non-conjugated diene is preferably 16 or less.

Blending ratio (weight ratio) of polyolefin resin/olefinic copolymer rubber in the present invention is 90/10–10/90, preferably 70/30–20/80.

The thermoplastic elastomers used in the present invention are preferably the following thermoplastic resin compositions.

(I) Thermoplastic resin compositions obtained by mixing various polyolefin resins represented by homopolymers of ethylene or propylene or copolymers of ethylene or propylene with a small amount of other polymerizable monomers with partially crosslinked products of ethylene-α-olefin copolymer rubbers which are bipolymer rubbers comprising ethylene and α-olefins of 3–14 carbon atoms or terpolymer or quaterpolymer rubbers comprising ethylene, α-olefins of 3–14 carbon atoms and additionally various polyene compounds. Examples of them are thermoplastic resin compositions obtained by mixing a crystalline polypropylene with a partially crosslinked ethylene-α-olefin copolymer rubber or a partially crosslinked ethylene-α-olefin-non-conjugated diene copolymer rubber at a weight ratio of 70/30–20/80. (JP-B-53-21021, JP-A-55-71738, JP-B-58-34837, and JP-B-1-103639).

(II) Thermoplastic resin compositions obtained by dynamically heat treating a blend of a polyolefin resin and an ethylene-α-olefin copolymer rubber in the presence of a small amount of a crosslinking agent (JP-B-53-34210, JP-A-53-149240, JP-A-53-149241, JP-B-58-13091 and JP-A-2-28232).

(III) Thermoplastic resin compositions obtained by additionally blending a polyolefin resin with the above composition of (I) or (II) (JP-A-53-145857 and 54-16554).

(IV) Thermoplastic resin compositions obtained by dynamically heat treating a blend of a peroxide-crosslinkable polyolefin resin represented by a homopolymer of ethylene or a copolymer of ethylene with a small amount of other polymerizable monomer, a peroxide-uncrosslinkable polyolefin resin represented by a homopolymer of propylene or a copolymer of propylene with a small amount of other polymerizable monomer, and an ethylene-α-olefin copolymer rubber in the presence of a small amount of a crosslinking agent (JP-A-55-71739).

If necessary, the thermoplastic elastomer may contain peroxide-uncrosslinkable hydrocarbon rubber-like materials represented by polyisobutylene and butyl rubber and/or mineral oil softening agents. In addition, additives such as heat stabilizers, anti-aging agents and lubricants can be added as far as they do not damage the object of the present invention.

For example, a preferred thermoplastic elastomer is obtained by dynamically heat treating a mixture comprising (a) 60–10 parts by weight of a crystalline polypropylene, (b) 40–90 parts by weight of an ethylene-propylene copolymer rubber or an ethylene-propylene-diene copolymer rubber [(a)+(b) being 100 parts by weight], and 5–100 parts by weight of (c) other rubber and/or (d) a mineral oil softening agent in the presence of an organic peroxide, thereby to partially crosslink the above rubber component (b).

Examples of the organic peroxide used for preparing the thermoplastic elastomer are dicumyl peroxide, di-tert-butyl peroxide, 2,5-dimethyl-2,5-di(tert-butylperoxy)hexane, 2,5-dimethyl-2,5-di(tert-butylperoxy)hexyne-3, 1,3-bis(tert-butylperoxyisopropyl)benzene, 1,1-bis(-tert-butylperoxy)-3,3,5-trimethylcyclohexane, n-butyl-4,4-bis(tert-butylperoxy) valerate, benzoyl peroxide, p-chlorobenzoyl peroxide, 2,4-dichlorobenzoyl peroxide, tert-butylperoxy benzoate, tert-butylperoxyisopropyl carbonate, diacetyl peroxide, lauroyl peroxide and tert-butylcumyl peroxide.

In the above partial crosslinking treatment with organic peroxides, there may be additionally used sulfur, peroxy crosslinking aids such as p-quinone dioxime, p,p'-dibenzoylquinone dioxime, N-methyl-N-4-dinitrosoaniline, nitrobenzene, diphenylguanidine, trimethylolpropane, and N,N'-m-phenylenedimaleimide, divinylbenzene, triallyl cyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl stearate.

The thermoplastic elastomer is prepared by mixing the above-mentioned components and dynamically heat treating the mixture, namely, melting and kneading the mixture. The kneading apparatuses include any of conventionally used ones such as open mixing roll, closed Banbury mixer, extruder, kneader, and continuous mixer. Among them, the closed type apparatuses are preferred and it is preferred to carry out kneading in an inert atmosphere such as nitrogen or carbon dixode. Kneading can be carried out at a temperature at which half-life of the organic peroxide used is less than 1 minute, usually 150°–280° C. preferably 170°–240° C. for 1–20 minutes, preferably 3–10 minutes.

The low-molecular weight polypropylenes modified with maleic anhydride used as component B in the present invention are those which have an addition amount of maleic anhydride of 1–8 parts, preferably 2–6 parts by weight and have a number average molecular weight of 2,000–20,000, preferably 4,000–15,000. This component B is obtained by grafting maleic anhydride on a low-molecular weight polypropylene prepared by pyrolytic method (about 350°–370° C.) from propylene homopolymer, random copolymer of propylene and 10 mol% or less of other α-olefin, block copolymer of propylene and 30 mol% or less of other α-olefin, or the like in the form of solution (using o-dichlorobenzene solvent) in the presence of a peroxide. Therefore, relation between addition amount of maleic anhydride and molecular weight is nearly unconditionally determined and when the addition amount is increased, the molecular weight decreases. Thus, structure of component B (molecular weight and addition amount of maleic anhydride) and amount of component B are determined from the point of balancing between introduction of polar group into olefinic thermoplastic elastomer and mechanical properties (especially low-temperature impact strength and tensile properties). Amount of the component B is 2–20 parts by weight, preferably 5–10 parts by weight for 100 parts by weight of the olefinic thermoplastic elastomer. If the amount of component B is less than 2 parts by weight, amount of the polar group introduced is small and so the effect to modify the surface is insufficient and no satisfactory coatability can be obtained. If it is more than 20 parts by weight, coatability is satisfactory, but mechanical properties are inferior.

The tackifier for rubbers used as component C may be those which are customarily used for unvulcanized or vulcanized rubbers. In particular, there may be used synthetic resin tackifiers such as $C_5$ and $C_9$ petroleum resins (aliphatic, aromatic, alicyclic and copolymer type), cumarone-indene resins, alkylphenol resins, and xylene resins and natural resin tackifiers such as rosins (gum type, tall oil type and wood type), rosin derivatives (hydrogenated, disproportioned, polymerized and esterified rosins and metal salts), and terpene resins.

Preferably, these are selected taking into consideration porality or viscosity of topcoating composition and swelling property between the solvent in the topcoating composition and the rubber in the elastomer. In the case of olefinic copolymer rubbers, aliphatic petroleum resins are preferred. Amount of component C is 1–20 parts by weight, preferably 2–10 parts by weight based on 100 parts of the olefinic thermoplastic elastomer. If it is less than 1 part by weight, swelling power with rubber is inferior and coatability cannot be obtained. If it is more than 20 parts by weight, mechanical properties (low-temperature impact strength) considerably deteriorate, though sufficient coatability can be obtained.

The composition of the present invention may contain other additional components as far as they do not damage so much the advantageous effects of the present invention. The additional components include, for example, inorganic fillers such as talc, calcium carbonate, mica and fibrous fillers, flame-retardants, lubricants, anti-static agents, anti-oxidants, pigments and dispersants.

The olefinic resin composition of the present invention can be obtained by melt kneading the components A–C simultaneously or stepwise. In the case of the component A being uncrosslinked, polyolefin resin and olefinic copolymer rubber which are constituents of component A, component B and component C may be simultaneously blended, but in this case the resulting composition seems to be somewhat inferior in coatability to the composition obtained using a crosslinked thermoplastic elastomer. Therefore, the most preferred method for production of this resin composition comprises preparing a crosslinked thermoplastic elastomer as component A and thereafter, blending therewith the remaining component B and component C. Blending of component B and component C can be carried out by the method customarily employed for blending of rubber, plastics and so on and for example, they may be melt kneaded by single-screw extruder, twin-screw extruder, Banbury mixer, kneader and the like. Twin-screw extruder is preferred since component B and component C are relatively low in melt viscosity and besides, component B is polar and hence shearing force must be applied in kneading and in addition, in the case of using Banbury mixer, the composition is apt to stick to a wall surface or rolls at discharging and it becomes difficult to take out the composition.

The present invention will be illustrated by the following nonlimiting examples and comparative examples. Test methods used therein are as follows.

(1) Method of Preparation of Test Piece

The resulting olefinic resin composition is injection molded (NEOMAT injection molding machine manufactured by Sumitomo Heavy Industries, Ltd., 13 ounces) at 230° C. to make a flat sheet of 100 mm width, 400 mm length and 3 mm thickness which is subjected to various tests.

(2) Surface Hardness

This is an instantaneous value measured in accordance with ASTM D2240 (Shore A scale and D scale).

(3) Tensile Property

This is measured in accordance with JIS K 7113 using a JIS No. 2 dumbbell specimen cut out from MD (machine direction) of flat plate at a pulling rate of 50 mm/min.

(4) Flexural Property

This is measured in accordance with JIS-K7203 at a span of 50 mm and a bending rate of 1 mm/min. at 23° C.

(5) Izod Impact Strength

This is measured in accordance with JIS-K7110 using a notched test speciment at −30° C.

(6) Coating Test

① Coating method: A flat plate of 100 mm width and 150 mm length is cut out from the central part of the above obtained test piece, subjected to degreasing by washing with Chlorothene vapor (30 seconds), then dried at room temperature for more than 1 hour, and coated with a topcoating composition (R271 of two-pack urethane type manufactured by Nippon Bee Chemical Co.) at a thickness of 30 μm. The coat is baked at 80° C. for 30 minutes to form a film. This is kept at 23° C. and 60%RH for 1 day and then evaluation is carried out.

② Initial adhesion of film:

This is expressed by the number of squares remaining among 100 squares in quares peeling test using cellophane tape (×/100).

③ Moisture resistant adhesion:

The coated sample is put under 60° C. and 98%RH for 10 days and then subjected to squares peeling test using cellophane tape (y/100).

④ Gasohol resistance:

The coated sample is dipped in a mixture of gasoline/ethanol=90/10 vol% for 30 minutes and peeling state of the film is observed and evaluated according to the following criteria.

| Evaluation | |
|---|---|
| "○": | Edge portion of the film is swollen, but the film is not peeled. |
| "△": | Edge portion of the film is swollen, and the film is slightly peeled. |
| "X": | The whole film is swollen and peeled. |

EXAMPLE 1

48 Parts by weight of oil-extended rubber (hereinafter referred to as "EPDM-1") comprising 100 parts by weight of ethylene-propylene-ethylidenenorbornene copolymer rubber having a Mooney viscosity ($ML_{1+4}$ 100° C.) of 143 and a propylene content of 25% by weight and an ethylidenenorbornene content of 5% by weight and 40 parts by weight of paraffinic process oil, 52 parts by weight of thermally decomposed polypropylene (hereinafter referred to as "PP-1") having a melt index (JIS-K7210 at 230° C. under a load of 2.16 kg) of 4 g/10 min before thermal decomposition and that of 30 g/10 min after thermal decomposition and 0.4 part by weight of N,N'-m-phenylenebismaleimide (hereinafter referred to as "BM") were melt kneaded by a Banbury mixer in a nitrogen atmosphere at 180° C. for 8 minutes. Then, the kneaded product was passed through rolls and pelletized by a sheet cutter.

Then, 100 parts by weight of the resulting pellets (hereinafter referred to as "CP-1") and 0.07 part by weight of 1,3-bis(t-butylperoxyisopropyl)benzene were mixed by a tumbling mixer and the pellets were subjected to dynamic crosslinking by a 65 mmφ extruder at 240° C. in a nitrogen atmosphere to obtain a partially crosslinked olefinic thermoplastic elastomer (ELA-1).

Then, 100 parts by weight of ELA-1, 10 parts by weight of polypropylene having maleic anhydride added in an amount of 4.8% by weight and a number average molecular weight of 4,000 (MPX 1010 manufactured by Sanyo Kasei Co. as is disclosed in a pamphlet published in April 1989) (hereinafter referred to as "MAH modified PP-1") and 2 parts by weight of an aliphatic petroleum resin TACKIROLL® 1000 (manufactured by Taoka Chemical Co.) (hereinafter referred to as "TACK-1") as a tackifier for rubber were melt kneaded by a twin-screw extruder (TEX-44 mm manufactured by Japan Steel Works Ltd.) at 220° C. to obtain pellets of the desired composition. Test results are shown in Table 1.

EXAMPLE 2

Example 1 was repeated except that amount of MAH modified PP-1 was 2 parts by weight.

EXAMPLE 3

Example 1 was repeated except that amount of TACK-1 was 10 parts by weight.

EXAMPLE 4

Example 1 was repeated except that alkylphenol aldehyde resin TACKIROLL® EP-30 (manufactured by Taoka Chemical Co.)(hereinafter referred to as "TACK-2") was used as the tackifier for rubber in place of TACK-1.

EXAMPLE 5

Example 1 was repeated except for using dynamically uncrosslinked olefin thermoplastic elastomer (ELA-2) obtained without using BM and 1,3-bis(t-butylperoxyisopropyl)benzene.

EXAMPLE 6

CP-2 in place of CP-1 was prepared in the same manner as in Example 1 except that 87 parts by weight of an oil-extended rubber (EPDM-2) comprising 100 parts by weight of ethylenepropylene-ethylidenenorbornene copolymer having a Mooney viscosity (100° C.) of 246 and having a propylene content of 38% by weight and an ethylidenenorbornene content of 4.8% by weight and 70 parts by weight of a paraffinic process oil was used in place of EPDM-1, 13 parts by weight of undecomposed polypropylene (PP-2) having a melt index of 12 g/10 min was used in place of PP-1 and 2 parts by weight of BM was used. Then, 100 parts of the resulting pellets (CP-2) and 0.3 part by weight of 2,5-dimethyl-2,5-di(t-butylperoxy)hexane were uniformly blended by Henschel mixer for 10 minutes.

The resulting blend was subjected to dynamic crosslinking at 250° C.±10° C. for 70 seconds by a twin-screw extruder (TEX 44 mmφ) which can provide a strong kneading power to obtain a partially crosslinked olefinic thermoplastic elastomer (ELA-3) which was softer than ELA-1. Thereafter, the procedure of Example 1 was repeated.

EXAMPLE 7

Example 1 was repeated except that MILASTOMER® M4800B (manufactured by Mitsui Petrochemical Industries Ltd.) which is partially crosslinked olefinic thermoplastic elastomer was used in place of ELA-1.

EXAMPLE 8

Example 1 was repeated except that SANTOPRENE® 201-64 (manufactured by Japan Monsanto Co.) which is a completely crosslinked product was used in place of ELA-1.

COMPARATIVE EXAMPLE 1

Example 1 was repeated except that ELA-1 which contained neither MAH-modified PP-1 nor TACK-1 was used.

COMPARATIVE EXAMPLE 2

Example 1 was repeated except that amount of the MAH-modified PP-1 was 25 parts by weight.

COMPARATIVE EXAMPLE 3

Example 1 was repeated except that amount of the MAH-modified PP-1 was 1 part by weight.

COMPARATIVE EXAMPLE 4

Example 1 was repeated except that 2 parts by weight of polypropylene (MAH-modified PP-2) having an addition amount of maleic anhydride of 10% by weight and a number average molecular weight of 1,000 was used in place of the MAH-modified PP-1.

COMPARATIVE EXAMPLE 5

Example 1 was repeated except that 20 parts by weight of polypropylene (MAH-modified PP-3) having an addition amount of maleic anhydride of 0.5% by weight and a number average molecular weight of 24,000 was used in place of the MAH-modified PP-1.

COMPARATIVE EXAMPLE 6

Example 1 was repeated except that TACK-1 was omitted.

COMPARATIVE EXAMPLE 7

Example 1 was repeated except that MAH-modified PP-1 was omitted.

COMPARATIVE EXAMPLE 8

Example 1 was repeated except that amount of TACK-1 was 25 parts by weight.

COMPARATIVE EXAMPLES 9-11

Examples 6, 7 and 8 were respectively repeated except that olefinic thermoplastic elastomer containing neither MAH-modified PP-1 nor TACK-1 was used as in Comparative Example 1.

Results of the above Examples and those of Comparative Examples are shown in Table 1 and Table 2, respectively.

TABLE 1

| | Composition | | | General properties | | | | | Coatability | | |
|---|---|---|---|---|---|---|---|---|---|---|---|
| Examples | Component A Part by weight | Component B Part by weight | Component C Part by weight | Hardness Shore A/D | Strength at rupture Kg/cm² | Elongation at rupture % | Flexural modulus Kg/cm² | Izod impact strength Kg·cm/cm | Initial adhesion X/100 | Moisture adhesion resistance y/100 | Gasohol resistance X Δ ○ |
| 1 | ELA-1 100 | MAH modified PP-1 10 | TACK-1 2 | D60 | 180 | 580 | 4900 | 13 | 100 | 100 | ○ |
| 2 | ELA-1 100 | MAH modified PP-1 2 | TACK-1 2 | D60 | 210 | 650 | 4600 | 28 | 100 | 99 | Δ |
| 3 | ELA-1 100 | MAH modified PP-1 10 | TACK-1 10 | D61 | 135 | 510 | 5100 | 11 | 100 | 100 | ○ |
| 4 | ELA-1 100 | MAH modified PP-1 10 | TACK-2 2 | D60 | 172 | 560 | 4900 | 14 | 100 | 94 | Δ |
| 5 | ELA-2 100 | MAH modified PP-1 10 | TACK-1 2 | D60 | 123 | 380 | 5100 | Not ruptured | 100 | 98 | Δ |
| 6 | ELA-3 100 | MAH modified PP-1 10 | TACK-1 2 | A71 | 85 | 480 | — | Not ruptured | 100 | 100 | ○ |
| 7 | MILAS-TOMER ® M4800 100 | MAH dofified PP-1 10 | TACK-1 2 | D60 | 145 | 530 | 5100 | 17 | 100 | 100 | ○ |
| 8 | SANTOPRENE ® 201-64 100 | MAH modified PP-1 10 | TACK-1 2 | A74 | 47 | 250 | — | Not ruptured | 100 | 100 | ○ |

TABLE 2

| | Composition | | | General properties | | | | | Coatability | | |
|---|---|---|---|---|---|---|---|---|---|---|---|
| Comparative Examples | Component A Part by weight | Component B Part by weight | Component C Part by weight | Hardness Shore A/D | Strength at rupture Kg/cm² | Elongation at rupture % | Flexural modulus Kg/cm² | Izod impact strength Kg·cm/cm | Initial adhesion X/100 | Moisture adhesion resistance y/100 | Gasohol resistance X Δ ○ |
| 1 | ELA-1 100 | — | — | D60 | 230 | 670 | 4500 | 35 | 34 | 0 | X |
| 2 | ELA-1 100 | MAH modified PP-1 | TACK-1 2 | D62 | 125 | 410 | 5500 | 5 | 100 | 100 | ○ |

TABLE 2-continued

| Comparative Examples | Component A Part by weight | Component B Part by weight | Component C Part by weight | Hardness Shore A/D | Strength at rupture Kg/cm$^2$ | Elongation at rupture % | Flexural modulus Kg/cm$^2$ | Izod impact strength Kg·cm/cm | Initial adhesion X/100 | Moisture adhesion resistance y/100 | Gasohol resistance X Δ ○ |
|---|---|---|---|---|---|---|---|---|---|---|---|
| 3 | ELA-1 100 | MAH modified PP-1 1 | TACK-1 2 | D60 | 227 | 660 | 4500 | 31 | 73 | 41 | X |
| 4 | ELA-1 100 | MAH modified PP-2 2 | TACK-1 2 | D60 | 165 | 470 | 4600 | 7 | 100 | 100 | ○ |
| 5 | ELA-1 100 | MAH modified PP-3 20 | TACK-1 2 | D61 | 135 | 430 | 5300 | 4 | 100 | 99 | ○ |
| 6 | ELA-1 100 | MAH modified PP-1 10 | — | D60 | 183 | 600 | 4900 | 17 | 68 | 27 | X |
| 7 | ELA-1 100 | — | TACK-1 2 | D60 | 191 | 590 | 4800 | 23 | 15 | 0 | X |
| 8 | ELA-1 100 | MAH modified PP-1 10 | TACK-1 25 | D62 | 88 | 240 | 5500 | 3 | 100 | 100 | ○ |
| 9 | ELA-3 100 | — | — | A63 | 61 | 570 | — | Not ruptured | 37 | 0 | X |
| 10 | MILASTOMER ® M4800 100 | — | — | D57 | 185 | 610 | 4900 | 43 | 28 | 0 | X |
| 11 | SANTOPRENE ® 201-64 100 | — | — | A67 | 55 | 310 | — | Not ruptured | 37 | 0 | X |

The olefinic resin composition of the present invention can be molded in the same manner as for the olefinic thermoplastic elastomer which is the base resin and can be used for the same uses as the base resin. The composition is especially advantageous in coatability when used as automobile external trim parts such as bumper, side mole and mudguard. That is, coated articles of sufficiently high film bond strength can be obtained with omitting primer coating step from conventional coating steps.

What is claimed is:

1. An olefinic resin composition which comprises:

(A) 100 parts by weight of a cross-linked olefinic thermoplastic elastomer obtained from a polyolefin resin which is a homopolymer or copolymer of alpha-olefin having 2-20 carbon atoms and an olefinic copolymer rubber which is an elastomeric copolymer composed of two or more alpha-olefins having 2-20 carbon atoms, or an elastomeric copolymer composed of two or more alpha-olefins having 2-20 carbon atoms and non-conjugated dienes, (B) 2-20 parts by weight of a low-molecular weight modified polypropylene having a number average molecular weight of 2,000-20,000 obtained by grafting maleic anhydride on polypropylene, said modified polypropylene having an addition amount of 1-8% by weight of maleic anhydride, and (C) 1-20 parts by weight of a tackifier for rubber.

2. An olefinic resin composition according to claim 1, wherein the tackifier is a synthetic resin tackifier or a natural resin tackifier.

3. An olefinic resin composition according to claim 2, wherein the synthetic resin tackifier is selected from the group consisting of C$_5$ and C$_9$ petroleum resins, coumaroneindene resins, alkylphenol resins and xylene resins.

4. An olefinic resin composition according to claim 2, wherein the natural resin tackifier is rosins.

5. An olefinic resin composition according to claim 2, wherein the natural resin tackifier is rosin derivatives selected from the group consisting of hydrogenated, disproportioned, polymerized and esterified rosins and metal salts of rosins.

6. An olefinic resin composition according to claim 2, wherein the natural resin tackifier is terpene resins.

7. A molded product made from the composition of claim 1.

* * * * *